(No Model.)
E. LUNKENHEIMER.
OIL CUP.
No. 299,929. Patented June 3, 1884.
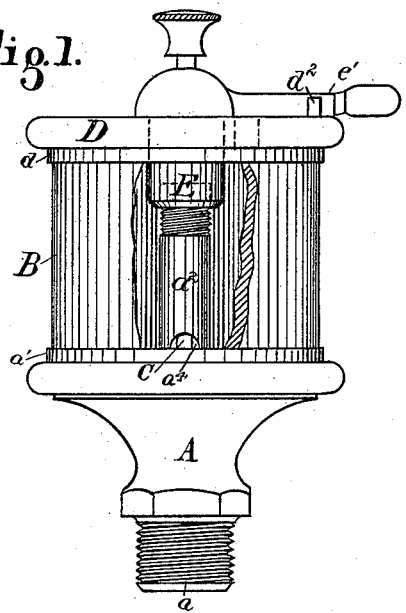
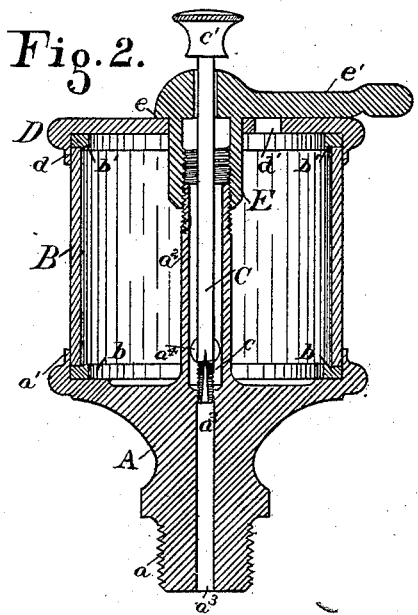
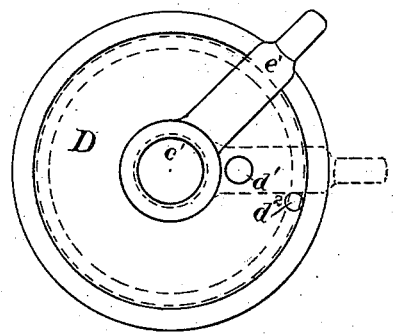
Attest
Chas Anderson
Jos H Sims
Inventor.
Edmund Lunkenheimer
By John W Hill
Attorney

UNITED STATES PATENT OFFICE.

EDMUND LUNKENHEIMER, OF CINCINNATI, OHIO.

OIL-CUP.

SPECIFICATION forming part of Letters Patent No. 299,929, dated June 3, 1884.

Application filed April 22, 1884. (No model.)

*To all whom it may concern:*

Be it known that I, EDMUND LUNKENHEIMER, of Cincinnati, in the county of Hamilton and State of Ohio, have invented certain new and useful Improvements in Oil-Cups, of which the following is a specification.

My invention relates to oil-cups with adjustable feed; and it consists in the adaptation to such cups of certain novel devices whereby the cup may be recharged with oil or other lubricant without changing or disturbing the feed.

In the accompanying drawings, Figure 1 is an elevation of my improved oil-cup; Fig. 2, a sectional view thereof on the vertical axis, and Fig. 3 a plan of the top or cap of cup.

Similar letters of reference indicate similar parts.

A is the base of cup, provided with the threaded shank $a$ for attachment to the bearing, with the annular rim $a'$ to receive the elastic washer $b$ and glass cylinder B, and with the central hollow stem, $a^2$, which receives the stem or valve C, the lower end, $c$, of which is threaded to correspond with thread in bore $a^3$ of base A. The upper end of stem C is provided with a milled head, $c'$, by means of which it is adjusted in bore $a^3$ of base A. Two small holes, $a^4$, at base of hollow stem $a^2$ permit the lubricant to flow from the cup to the bore $a^3$ of base A, and thence to journal or wrist-pin, as the case may be.

D is the top or cap of cup, provided with the annular rim $d$, to receive elastic washer $b'$ and cylinder B, and bored centrally for reception of nut E, which latter is threaded to match thread on upper end of hollow stem $a^3$, and provided with a shoulder, $e$, to bear upon upper surface of cap D. The nut E is also furnished with an arm, $e'$, which arm extends slightly outside the edge of cap D, as shown in Fig. 3. In the top or cap D an orifice, $d'$, is drilled near the edge thereof large enough in diameter to take the spout of an ordinary oil-can, over which orifice the arm $e'$ of nut E plays. The width of arm $e'$ is greater than the diameter of orifice $d'$, and when the arm is over the orifice the latter is entirely closed against loss of lubricant from within or entrance of dust of foreign matter from without. The stem C passes freely through the center of nut E, as shown in Fig. 2, and may be adjusted to any desired flow of lubricant, which adjustment is undisturbed by the manipulation of nut E and arm $e'$. A stop-pin, $d^2$, in cap D limits the motion of arm $e'$, and prevents it passing beyond the orifice $d'$. The pressure of arm $e'$ upon cap D is sufficient to make a reasonably close joint, and as the motion of arm $e'$ and nut E are always coincident, it is obvious that the swinging of the arm over the orifice $d'$ serves to tighten the cap D down upon cylinder B, as well as to close the opening through which the lubricant is introduced.

The elastic washers $b\ b'$, preferably of cork, prevent injury to the glass cylinder B by forcing down of cap D, and make an air and oil tight joint with base A and cap D of cup.

If desired, the glass cylinder B may be omitted, and a metal cylinder cast with base A be used instead; otherwise the construction will be as shown and described.

The operation is obvious from the drawings. The arm $e'$ is pressed back to uncover or open orifice $d'$, when the cup is charged with the lubricant. The arm $e'$ is then pressed in the direction of stop-pin $d^2$ to close the orifice $d'$, and, if desired, to tighten cap D on elastic washers $b$ and $b'$, cylinder B, and base A. The cup is then ready for use.

I am aware that oil-cups which can be refilled without changing the feed are not new; but these are either of the kind in which a removable screw-plug or screw-cap is employed, which plug or cap is liable to loss when removed, or of the kind in which a sliding gate under the cover is used, which gate is liable to open by the vibration of the cup on a moving bearing, as on the bearing of an engine-crank pin. In my improved cup all the parts are permanently attached together, no part requiring removal for refilling of cup; and any degree of pressure to retain the arm $e'$ over the orifice $d^2$ may be applied by pressing the arm against stop-pin $d^2$ and rotating cap D until the desired pressure is attained.

The elastic washers $b\ b'$ prevent injury to the glass cylinder from the pressure of cap D.

The cup is simple, of few parts, cheaply constructed, and meets all the requirements of an adjustable-feed oil-cup.

Having described my invention, what I claim is—

In an adjustable-feed oil-cup, the combination of the cap D, provided with orifice $d'$ and stop-pin $d^2$, and the nut E, provided with shoulder $e$ and arm $e'$, when arranged and operating substantially as and for the purpose described.

In testimony whereof I have signed my name to the foregoing specification in the presence of two subscribing witnesses.

EDMUND LUNKENHEIMER.

Witnesses:
CHAS. ANDERSON,
JOHN GARMORE.